(12) United States Patent
Bush

(10) Patent No.: US 8,681,260 B2
(45) Date of Patent: Mar. 25, 2014

(54) DUAL SITE IMAGING CAMERA

(75) Inventor: Michael Garret Bush, Coatesville, PA (US)

(73) Assignee: Clear Align LLC, Eagleville, PA (US)

( * ) Notice: Subject to any disclaimer, the term of this patent is extended or adjusted under 35 U.S.C. 154(b) by 514 days.

(21) Appl. No.: 12/807,738

(22) Filed: Sep. 13, 2010

(65) Prior Publication Data

US 2011/0074983 A1 Mar. 31, 2011

Related U.S. Application Data

(60) Provisional application No. 61/276,429, filed on Sep. 11, 2009.

(51) Int. Cl.
*H04N 5/225* (2006.01)

(52) U.S. Cl.
USPC .......................... 348/344; 348/297; 348/364

(58) Field of Classification Search
USPC .......................... 348/343–344, 294–297, 364
See application file for complete search history.

(56) References Cited

U.S. PATENT DOCUMENTS

| | | |
|---|---|---|
| 5,047,845 A | 9/1991 | Tomlinson et al. |
| 7,180,554 B2 | 2/2007 | Divelbiss et al. |
| 2002/0088942 A1 | 7/2002 | Metcalf et al. |
| 2003/0160886 A1* | 8/2003 | Misawa et al. ............... 348/347 |
| 2007/0081815 A1 | 4/2007 | Zomet et al. |

OTHER PUBLICATIONS

Nayar, S. et al., Programmable Imaging: Towards a Flexible Camera, International Joural of Computer Vision 70(1), pp. 7-22, 2006.

* cited by examiner

*Primary Examiner* — Tuan Ho
(74) *Attorney, Agent, or Firm* — Kenneth J. Lukacher Law Group

(57) ABSTRACT

An imaging system or camera having an array of elements switchable between two states for measuring of light received by the imaging system on a pixel by pixel basis to form two separate images simultaneously over a common integration time in which switching takes place faster than the integration time of the camera. Optical switching may be provided by a spatial light modulator along one of two paths each associated with a detector for one of the images, or each path being associated with one of two non-overlapping regions of the same detector, where each region provides one of the images. Electronic switching may be provided in which for each pixel a photodetector provide an electrical signal onto a switching element which switches the signal onto one of two sites for integrating the signal and providing a pixel value, where the two sites are each associated with a different one of the images.

28 Claims, 8 Drawing Sheets

DUAL SITE IMAGING CAMERA

This Application claims priority to U.S. Provisional Application No. 61/276,429, filed Sep. 11, 2009, which is herein incorporated by reference.

FIELD OF THE INVENTION

The present invention relates to a dual site imaging camera (system and method) for capturing two images in the camera over a common exposure time, and particularly to an imaging system which switches on a pixel by pixel basis between two images in measuring light received, to form such images simultaneously over a common integration time, where such switching takes place faster than the integration time of the camera. Switching may be provided optically by a spatial light modulator spatially associated with each of the images in which on a pixel by pixel basis one or more mirrors of the modulator associated with the pixel direct light received along one of two paths having optics for directing such light onto pixel sites of two detectors or two different non-overlapping regions of the same detector associated with each of the images. Electronic switching may also be performed on a pixel by pixel basis in which for each pixel a photodetector provides an electrical signal onto a switching element which switches the signal onto one of two sites (each associated with a different one of the two images) for integrating the signal to measure light received by the photodetector and provide a pixel value. The camera is useful for lock-in imaging, high dynamic range imaging, dual band imaging, or other imaging application benefiting from two images per exposure with pixel by pixel switching control between images.

BACKGROUND OF THE INVENTION

Modern electronic imaging systems function by optically imaging the scene onto a focal plane composed of a two-dimensional array of sensors (or photosensitive sites) Each sensor collects or integrates the charge generated by a photo-responsive circuit element such as a photodiode, and digitizing that charge output to create a digital number representative of the amount of light that fell onto a particular pixel in some well defined exposure time. The array of pixels correspond to some imaged area in the scene, and therefore the two dimensional array of pixels can form an intensity map of the light levels present at each location in the scene.

In typical imaging systems, the whole photosensitive area of the imager (the film, or the array of photodiodes, or charge coupled devices) is active and exposed to light for a window of time which is common across all the elements of the active sensor area. For example, a mechanical shutter may open and close, letting the light in and then shutting it out. Alternately, an electronic signal may be used to reset the integrating components in the imager at some initial time, and a second signal may be used to shut the integration off and allow pixels to be read. This means that every signal that composes the image was captured under similar or identical circumstances. While this has many advantages, it can be a disadvantage when the scene is composed of very bright and very dim signal sources. If the exposure time is short, the dim signals will not be visible, and if the exposure time is too long, the bright signals will be saturated. If one is interested in seeing dim signals against bright backgrounds, discrimination techniques are needed, such as optical filters, to raise the effective level of the signal of interest against the signal of the background. Furthermore, imaging a modulated source which changes faster than the integration time for imaging is difficult to detect using traditional digital imaging approaches.

SUMMARY OF THE INVENTION

Accordingly, it is feature of the present invention to provide an improved camera that enables the acquisition of two images of the same field of view or scene by use of switching element(s) for each picture element (pixel) which switches imaging between the two images faster than the integration time of the sites for measuring light received by the camera.

Briefly described, the present invention embodied an imaging system (camera or imager) having an array of elements switchable between two states which are spatially related to a two-dimensional array of pixel positions. For each of the pixel positions, a first site and a second site is provided for measuring light received by the system to provide values of pixels comprising first image data and second image data, respectively. The first site and second site each operate independently for measuring light received over a common integration time. For each pixel position, when one or more of the switchable elements, which are spatially related with the pixel position, are switched to a first state then the first site for that pixel position measures light received by the system, and when one or more switchable elements, which are spatially related with that pixel position, are switched to a second state the second site for that pixel position measures light received by the system. The switchable elements are operable to switch between states faster than the integration time of the first and second sites.

The first image data represents a two-dimensional array of pixels having the values from the first site for each of the pixel positions, and the second image data represents another two-dimensional array of pixels having values from the second site of each of the pixel positions. Preferably, the first image data and the second image data spatially correlate with each other, and the first image data and the second image data each represent one of successive frames of different video streams which may be output to two different displays. The first site and the second sites for each of the pixel positions are preferably operated synchronously under control of a microcontroller, and such microcontroller also controls the state of each of the switchable elements to provided the desired switching of light received by the system on a pixel by pixel basis to form two separate images represented by the first and second image data over a common integration time. Preferably, the states of the switchable elements are simultaneously updated at least four times faster than the integration time, and in the array of switchable elements adjacent ones of such elements are switched 90 degrees out of phase with respect to each other to provide a first plurality of switchable elements (or a first population) switching at the same one of said states at the same time, and as second plurality of switchable elements (or a second population) switching at the same state that is 90 degrees out of phase with respect to the first plurality of switchable elements.

In one embodiment of the present invention, the first site for each pixel position represents a light receiving and measuring element (pixel site) of a first detector providing a pixel value, and the second site for each pixel position represents a light receiving and measuring element (pixel site) of a second detector providing a pixel value. In another embodiment, the first site for each pixel position represents a light receiving and measuring element of a first region of a detector, and the second site for each pixel position represents a light receiving and measuring element (pixel site) of a second region of the same detector, where the first and second regions are non-overlapping. In both of these embodiments, the switchable elements may be micro-mirrors of a bi-stable spatial light modulator, such as a digital micro-mirror device, where each micro-minor is positionable between one of two states and when switched to the first state, light received by the camera is steered along a first path, and when switched to a second state, light is steered along a second path. First optics or optical system directs light along the first path to the first detector (or the first region of the detector), and second optics or optical system directs light along the second path to the second detector (or second region of the same detector non-overlapping with the first region). Optionally, one or more optical filters may be provided along one of the first and/or second optical paths to enable light along the first and second paths to be different wavelength or range or wavelengths, or of different polarization.

Each of the switchable elements may be spatially related to a different pixel position, or two or more switchable elements may be spatially related to a different ones of the pixel positions, or each switchable element may be spatially related to two or more pixel positions, depending on the size of the array of the switchable elements and desired detection resolution of the first and second image data.

In the case where each of said switchable elements is spatially related to a different one of the pixel positions, another embodiment of the present invention is provided where for each of the pixel positions the first site and the second site for that pixel position are both associated with a common light receiving element (e.g., photodetector) for converting light into an electrical signal, and when the switchable element spatially related with that pixel position is switched to the first state, the first site for that pixel position measures (or integrates) the electronic signal to provide a pixel value, and when the switchable element spatially related with the pixel position is switched to the second state the second site for that pixel position measures (or integrates) the electronic signal to provide a pixel value. This provided electrical switching rather than optical switching and steering of light along two paths of the first two embodiments. In both cases of electrical and optical switching, the particular operation of the switching elements to desired states is controlled by the microcontroller to select the desired operation of the imaging system. In other words, the switching mechanism chooses which site the pixel is directed to is modifiable on a per pixel basis, at update rates substantially higher than typical imaging frame rates.

An objective lens or lens system is provided having telecentric optics for imaging on to the spatial light modulator for optical switching or imaging onto the array of photodetectors for electronic switching.

The first image data and second image data over the integration time represents one exposure of the imaging system. The microcontroller may control the start and stop of the integration by the first and second sites associated with the pixels of first and second image data, respectively. The microcontroller may utilize the first and second image data to control operation of the switching elements for the subsequent exposure, or change one of timing or selection of the states of switching elements for subsequent exposure by the first and second sites. The second image data may represent overflow data, and combined with the first image data in accordance with the duration the switchable elements were in the first state during the exposure to determine high dynamic range pixel values for each of the pixels. Further, the microcontroller may determine the difference on a pixel by pixel basis between the first image data and the second image data formed by patterns of switching elements to derive a quadrature amplitude image and a quadrature phase image. Such phase image may be used to infer range information in the scene captured by the camera. Also, the microcontroller may add on a pixel by pixel basis the first image data and the second image data to provide third image data; such may represent a background image of a scene which may be used to extend the dynamic range of the imaging system. The quadrature amplitude image and a quadrature phase image if determined may be used to enhance, modify, annotate, or transform the third image data. Such different processing of the first and second image data provides features for the imaging systems for synchronous demodulation, dual band, or high dynamic range imaging, within a single camera integration time. The digital processing of the microcontroller of the imaging system may be performed all or in part by a computer system which may be coupled to the imaging system to receive the first and second image data for each exposure.

Thus, an imaging system's switching or beam steering mechanism is provided, with individual control for each picture element (pixel) of the image, to segregate the image collection into two separate data values per pixel. The switching mechanism operates independently for each pixel and at rates faster than the integration time of the imaging system. The information contained in each integration location (or site) can be read out as two independent fields of data, so that the imaging system produces two images per exposure. The system may be realized by the combination of independent imaging focal plane detector arrays and an appropriate bistable beam steering system aligned to both detector arrays. The beam steering mechanism can also be routed to different areas of a single detector array with no overlap between the two outputs. This could be accomplished using a digital micro-mirror array, such as commonly utilized in projection display applications. The system may also electronically switch the integration sites of a given pixel element in a single focal plane between one of two capacitors.

In configurations where the beam steering or integration location (site) selection mechanism operate at rates faster than the integration time, different regular patterns of beam steering modulation will perform a synchronous demodulation of appropriately coded optical signals present in the imaged scene when the difference of the two fields is taken. The sum of the two fields represents an equivalent result from a traditional imager. Other configurations that exploit the individual control achievable for each switching element enable extended dynamic range imaging by shunting over saturated light into alternate integration sites and presenting the data as extrapolated from the in-pixel integration time and the actual signal. Such a system utilizes the shunt image to tune the next image capture. Finally, in the case where the switching is performed optically, dual band imaging is enabled by inserting dissimilar optical filters in the appropriate path and operating the beam steering as a programmable beamsplitter.

In the digital imaging system of the present invention, there are two sets of picture elements or integration sites for each physical scene location, and a mechanism for switching which site (or element) is active at a given time. The active element is collecting charge from the scene in the same way as a traditional imager. The inactive element is only collecting dark current (the signal present with no input). Each switching element is controllable independently of the others, so that a single pixel can be switched from one state to the other without impacting the other pixels. This may be performed optically, by physically diverting the beam from one pixel to its corresponding element, or electronically, by diverting the collected charge from one storage site to an independent site. This configuration allows several applications which serve to create contrast in the image, allow for new kinds of image acquisition, reduce the cost of key components, and perform more complex imaging techniques in a single exposure time for the camera system, which reduces the impact of motion blur.

The imaging system can report the results for either one field of pixels or the other independently onto monitors. The sum of these results is equivalent to a single system with a single integration, with a small noise penalty from storing the results separately. The data in the individual fields may be used in different ways depending on the configuration of the per pixel switching, as described below.

The camera has improved sensitivity for detecting modulated light sources in the scene which modulate faster than the integration time of the camera.

In a lock-in imaging application, the pixels' active sites would be switched at some frequency faster than the overall integration time of the imager. Adjacent pixels are switched ninety degrees out of phase with respect to each other. The difference of pixel data, followed by an aggregation of neighboring data, allows the calculation of a quadrature measurement of a synchronously demodulated signal. The phase and magnitude information can be recovered to display a spatially registered intensity and phase map.

In high dynamic range applications, the pixels' initial sites are switched to the alternate site once during the integration, at a time that is a function of the signal level that was present in that pixel in the last frame of data. The output signal levels are calculated from the signal present and the pixel's exposure time, and new timing information is generated for the next frame. This allows bright signals to be captured in the same exposure frame as a dark signal—the bright signals would integrate for a short time period, and all subsequent light would be diverted into the alternate integration site, acting like an overflow valve. The darker areas of the image would continue to integrate. The composite of the pixel data and the timing data is an image with extended bit depth, without relying on very deep A/D converters.

In a dual band imaging system, an additional optical element is introduced to modify the light that is absorbed in the photoactive system that differs for one site as compared to the other. This allows the difference image to represent a different optical contrast or property as a function of the inserted optical element. This may include optical filters, for selecting particular wavelength bands, or polarizers, for selecting particular polarization states.

The present invention also embodies a method for capturing two images in a camera comprising the step of switching light received by the camera on a pixel by pixel basis to form simultaneously two separate images over a common integration time in which switching of light between the images takes place faster than the integration time. Preferably the pixels of each of said images spatially correspond with each other.

The term dual site imaging herein refers to imaging two images per camera exposure (or integration time) in which for each two-dimensional pixel position being imaged, light is measured by one of two sites each associated with one of two spatially correlated images during the same the integration time.

BRIEF DESCRIPTION OF THE DRAWINGS

The foregoing and other features, and advantages of the invention will become more apparent from a reading of the following detailed description in connection with the accompanying drawings in which:

FIG. 5B is a block diagram similar to FIG. 5A, but using a single detector and two imaging outputs there from;

DETAILED DESCRIPTION OF THE INVENTION

Figure 1:
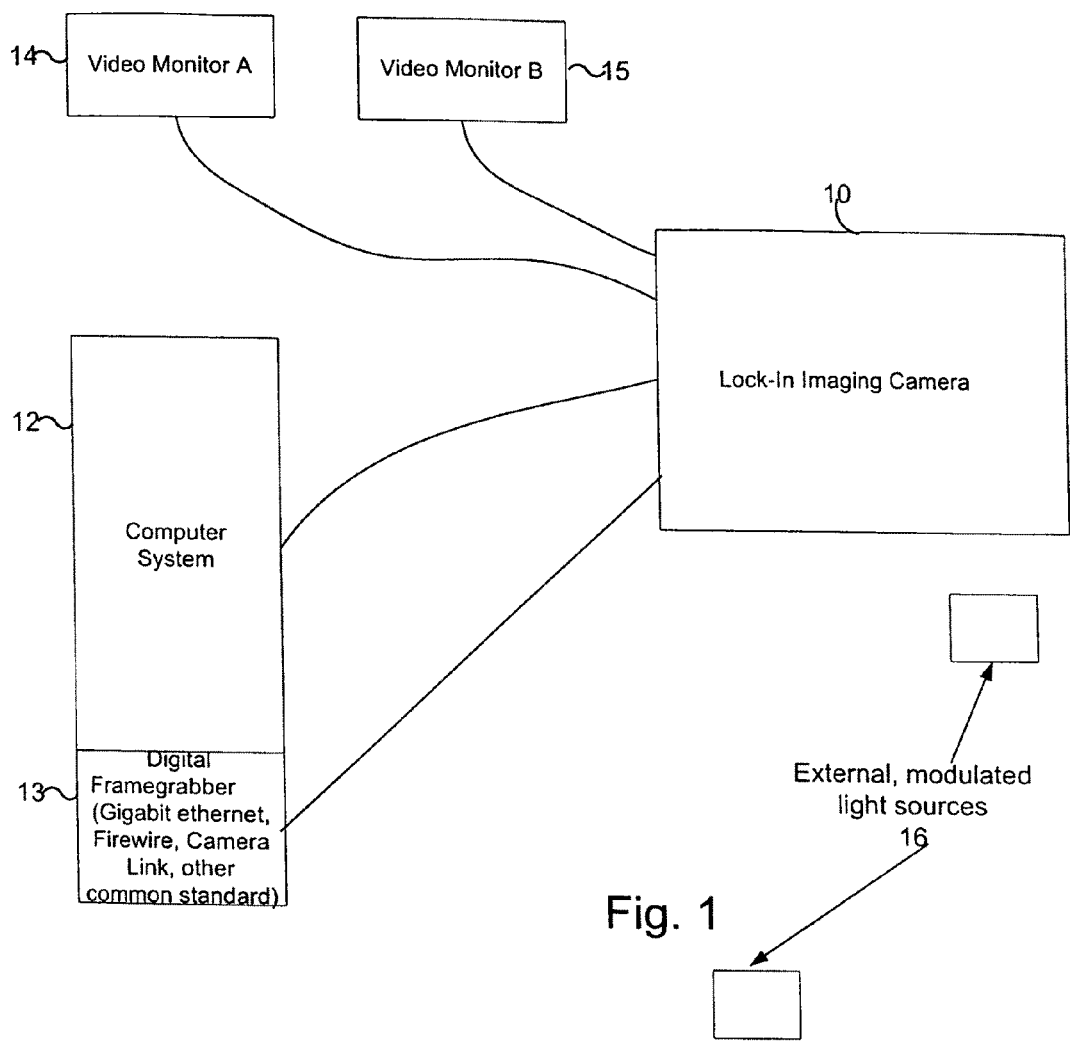
FIG. 1 is block diagram of the system with the camera of the present invention.

Referring to FIG. 1, the system 8 is shown using the camera 10 of the present invention. Camera 10 is an electro-optical imaging system that may operate like a typical digital camera. Commands and queries can be sent to and received from the camera over a serial communications link from a personal computer system 12, such as a desktop, laptop, or other programmed microprocessor based system, to control the operation of camera 10.

Computer system 12 may have components 13 for digital frame capture, such as available from National Instruments line of cards like the PCI-1426, or including types of frame grabbing standards such as Gigabit Ethernet Vision, or Firewire, or high speed USB, or Camera Link. The camera 10 can provide digital representations of the images it captures at a rate of speed commensurate with the live acquisition rate of the camera over an appropriate cable (or wireless) to such components 13 in the computer system 12. The camera 10 also presents a video stream data suited for display on video monitors 14 and 15, such as CRT or LCD displays, by a data connection protocols, such as HDMI, DVI, or NTSC analog video streams, or the like. As camera 10 is producing multiple images per exposure, there are two such video outputs, referred to as Video Output A and Video Output B, to drive the two different video monitors 14 and 15 independently. The specific selection of a video source to be mapped to a particular output port would be handled by a command received from the attached computer system 12, or potentially a hardware switch on the back of the camera 10. Instead of camera 10 providing the two image data streams, computer system 12 may output to monitors 14 and 15 the two image data streams received via components 13, or computer system 10 may be coupled to a single monitor capable for displaying videos from both image data streams (or switching between video imaging the two image data streams). As typical of a computer system, computer system 12 may have other hardware/software components such as keyboard, mouse or other cursor tracking mechanism, GUI, display, or the like for enable a user to interact with the computer and its operation of camera 10. Power is supplied to computer system 12, camera 10, and monitors 14 and 15 to enable their operation.

In the field of view of the camera 10, there may be one or more independent light sources or emitters 16. These emitters 16 are disconnected devices which are not connected to system 8. They are modulated at some frequency, meaning they switch between two states of brightness, for example, on and off. The frequency may differ from one emitter 16 to another. The frequency is preferably stable for at least as long as a camera exposure time. The duty cycle of the emitter's modulation is 50%. One feature of the present invention is to increase the sensitivity with which the camera is able to detect and locate these modulated light emitters 16.

Figure 2:
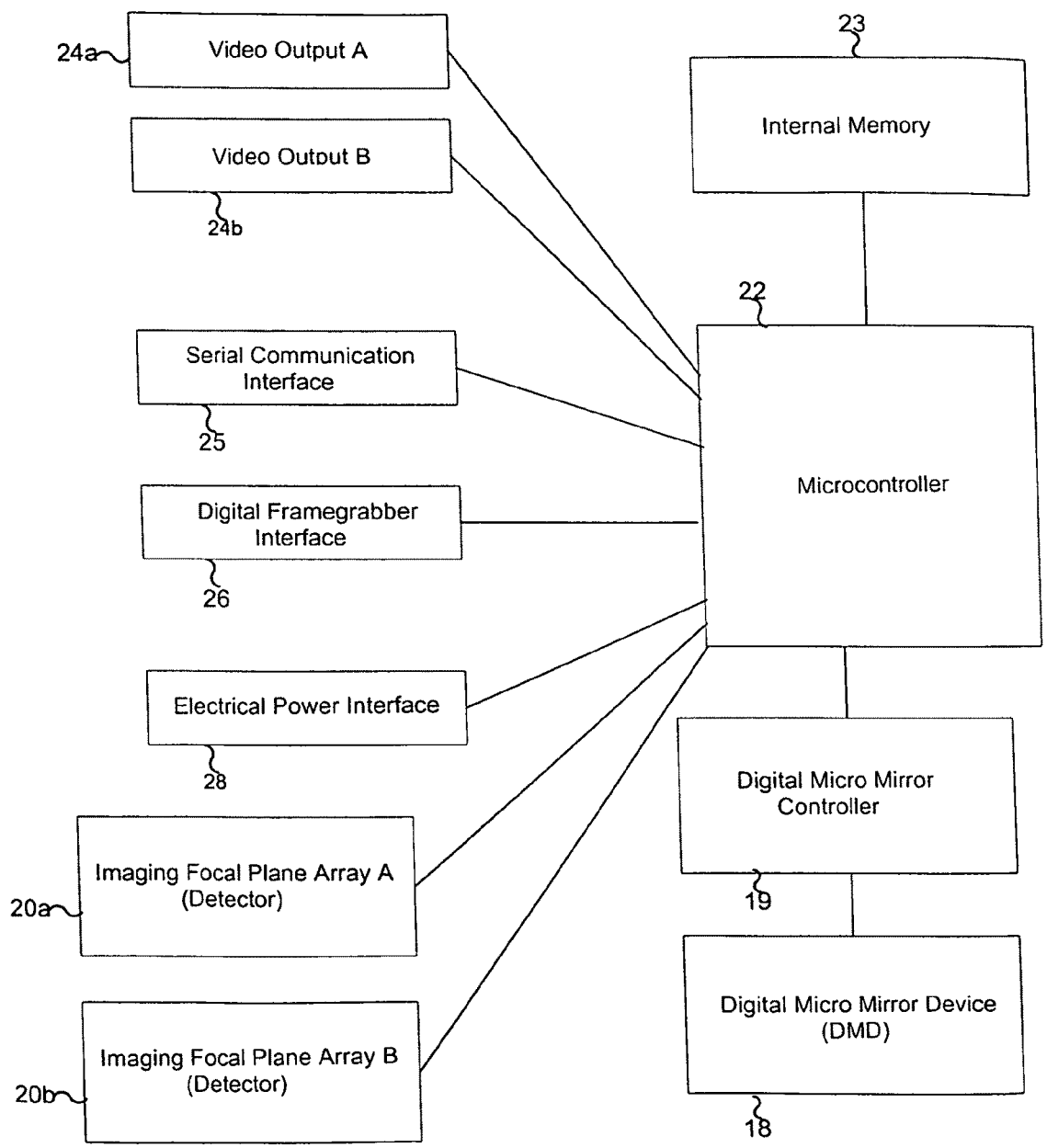
FIG. 2 is a block diagram of the camera of FIG. 1.

Referring now to the camera's electrical block diagram of FIG. 2, camera 10 has a digital micro-minor device (DMD) 18, such as the Texas Instruments DLP line of products, or other spatial light modulators may be used. The DMD 18 is a high resolution array of mirrors which can be actuated into one of two states at a high rate of speed. The control data for the DMD 18 is processed and staged by a DMD controller 19 electronics set, responsible for sending the large amounts of data to the DMD 18 with appropriate timing. The system includes two detector (or sensor) arrays A 20a and B 20b at the imaging focal plane, such as CCD or CMOS detectors (or imaging chips). Each detector array has a two-dimensional array of photosensitive sites for receiving and measuring (integrating) light received thereupon to output image data representing of a two-dimensional array of pixels over the integration period of the detector. The DMD 18 has a two dimensional array of mirrors driven by controller 19. Each mirror is independently controllable and is able to be positioned in one of two states, called 'on' and 'off'. The mirrors of the DMD 18 are spatially related to the locations of pixels in the two-dimensional array of each detector 20a and 20b. There may be approximately as many mirrors as there are pixels in each image output frame of the camera. For example, one mirror in the DMD corresponds to one pixel in the array of each detector 20a and 20b, or some square, integer number of pixels in an oversampled condition.

The detector arrays 20a and 20b are given control signals, such as triggers, exposure times, gain levels, and reset pulses, and produce arrays of digital data representing the results of image acquisitions. These control signals are generated by a microcontroller 22, such as a microprocessor, or an FPGA based device like a Xilinx Virtex 5. This microcontroller 22 additionally supplies the patterning information to the DMD control chip 19, and so is ultimately responsible for the behavior of the mirrors within the DMD 18. The typical pattern generated by the microcontroller 20 is one that switches the mirrors from one state to the other at a specific frequency, with a 50% duty cycle. Every other pixel in the DMD 18 would be controlled to operate 90 degrees out of phase with respect to its neighbor. The overall frequency of the mirrors would be set by microcontroller 22 internal register or external command (from computer system 12) processed by the microcontroller. The microcontroller 22 is also be responsible for taking in the digital data produced by the detectors 20a and 20b at the imaging focal planes. The microcontroller 22 utilizes data stored in local internal non volatile memory 23 to produce spatial registration and uniformity correction on each of the incoming digital data streams. It also perform calculations on those streams to produce a set of two output data streams each related to the received light from detectors 20a and 20b, respectively. These different streams would be encoded as standard video formats and made available over the two video interfaces 24a and 24b to monitors 14 and 15, respectively. The specific streams to be selected is set by a command handled by the microcontroller 22, originating from the serial communication interface 25. The microcontroller 22 in general is responsible for parsing, responding to, and dealing with error conditions related to commands that are presented over this interface. Additionally, digital data can be formatted and made available over the digital framegrabber interface 26 to component 13 of computer system 12 (FIG. 1). The specific format of this data may be conformant with any number of industry standards, such as Firewire or Camera Link. A power cable provides power to the camera 10 via conditioning and protection circuitry 28.

Figure 3:
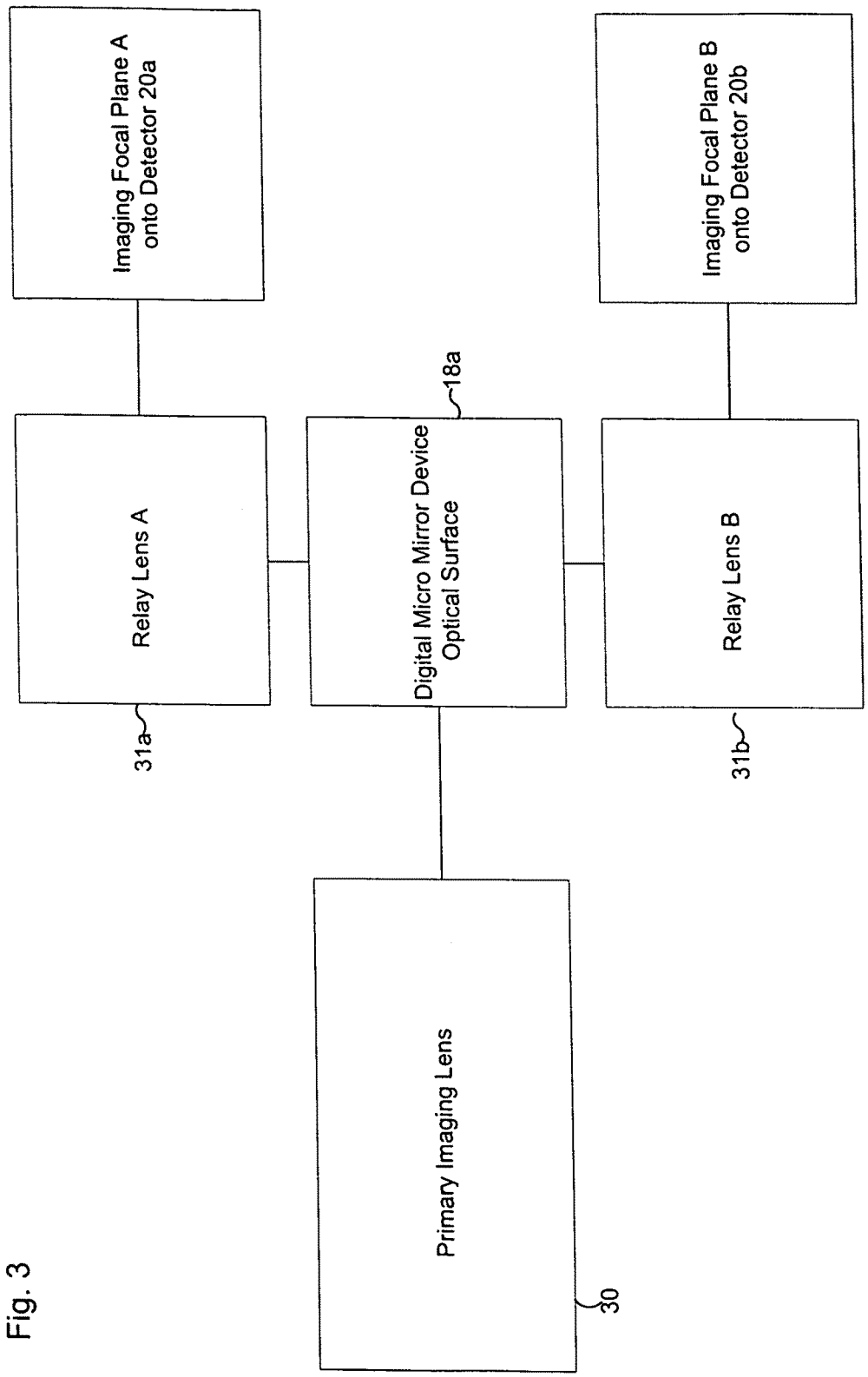
FIG. 3 is a block diagram of the optics of the camera of FIGS. 1 and 2.

Referring to the optical block diagram of FIG. 3, the camera 10 has a primary imaging lens or optical system 30, which is very similar to a typical camera lens, but with a more telecentric design than might be typical. This lens forms a primary image on the optical surface 18a of DMD 18. This surface 18a is defined by the location of the mirrors of the DMD actuated at the time the light is received from lens 30. This imaging lens 30 is oriented normal (perpendicular) to the surface 18a, and is of a telecentric design so that both on-axis and off axis rays are normal to the DMD 18 at all points across the DMD. Relay lenses 31a and 31b transfer the image from the mirror plane of the DMD 18 to the image plane A and B, respectively, of the focal plane detectors 20a and 20b, respectively.

The optics and pattern of actuation of the DMD 18 mirrors will now be described in more detail in connection with FIG. 5A. These mirrors of DMD 18 steer the incoming light from lens 30 into one of two directions 32a and 32b, corresponding to the stable states of the mirrors. Relay lenses 31a and 31b transfer the image along paths 32a and 32b from the mirror plane of the DMD 18 to the image plane A and B, respectively, of the focal plane detectors 20a and 20b, respectively, which output Image 1 24a and Image 2 24b, respectively. The relay lenses 31a and 31b can either magnify, or demagnify, the image onto their respective focal plane array, as needed, and not impart distortion. As stated earlier, the two dimensional array of mirrors of the DMD 18 are spatially related to the pixels in the two-dimensional array of each detector 20a and 20b, where each mirror is independently controllable by the microcontroller 22, via driver 19, and is able to be positioned in one of two states. The two states, called 'on' and 'off', differ in that the mirror angle changes from one value to another to either a direction along paths 32a or 32b. The mirrors are repeatable in position and transition from one state to the other quickly. The entire array of mirror states can be commanded to update simultaneously. The array of states (a frame of data) is transferred to the DMD 18 at a high rate of speed, for example 20,000 frames per second, via controller 19, from microcontroller 22. If needed, buffers, or memory cells, in addition to the microcontroller 22, may be provided to control the flow of data into the DMD.

Figure 5A:
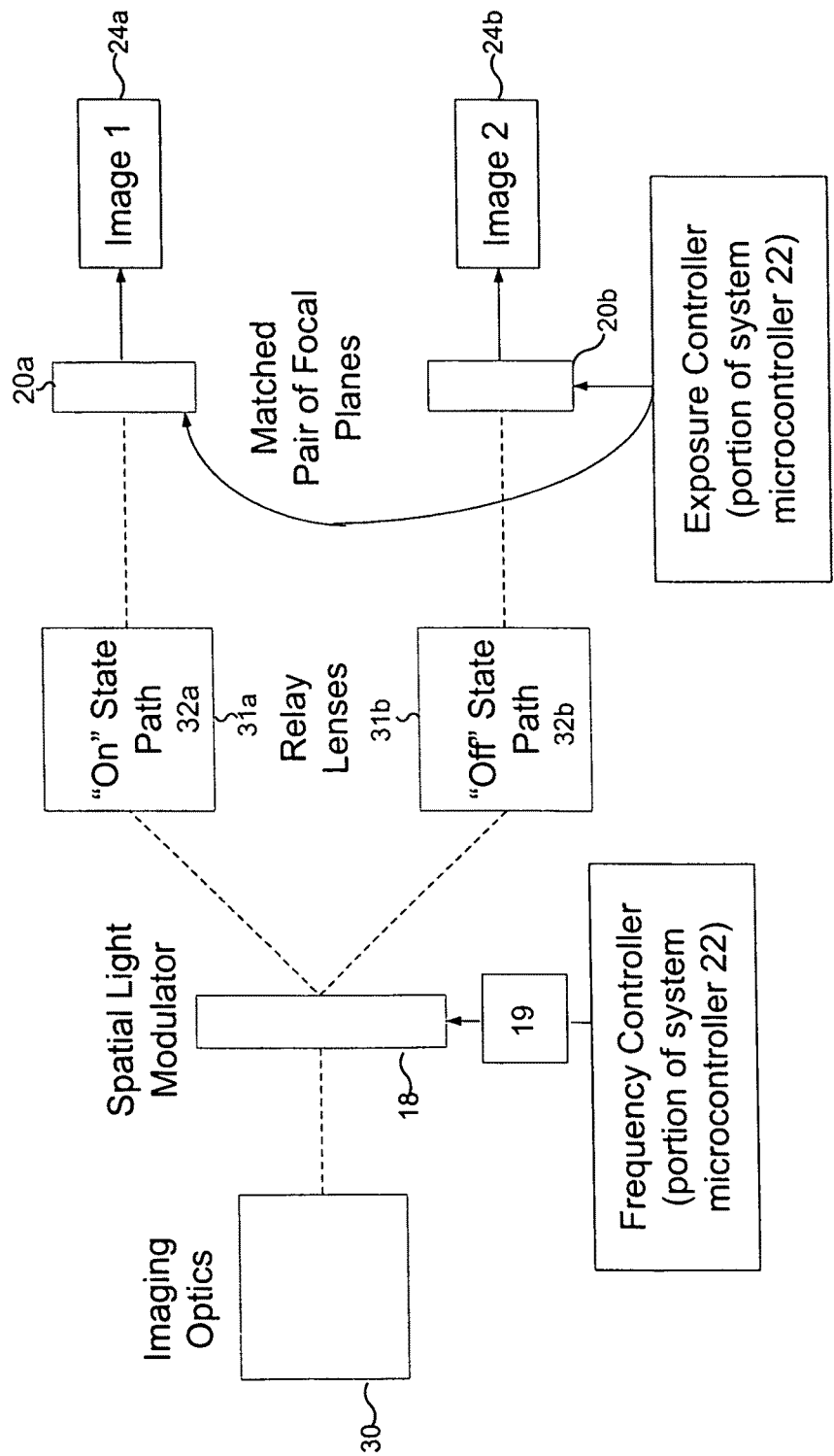
FIG. 5A is a block diagram showing dual site optical switching for modulated imaging along two optical paths of light forming two images in the camera of FIGS. 1 and 2, in which the imaging light is modulated and two detectors each capture a separate image.

The frequency controller shown in FIG. 5A is a part of the microcontroller 22 and outputs signals to the DMD controller 19 to provide the desired positioning of mirrors of DMD 18. The microcontroller 22 may support different modes of operation which are essentially different patterns of frame data being loaded into the DMD 18. Preferably, an external command or control selects a frequency value, such as provided via computer system 12 to the microcontroller. As the microcontroller 22 generates frames of data to the DMD 18, via controller 19, the mirror states are switched in two equal sized populations. The first population of mirrors is every other mirror, so no two mirrors are adjacent at the same state. These switch from the 'on' state to the 'off' state at the frequency value specified by the external command or control. The second population of mirrors is the remainder of the array. Therefore, this second population is also a set where no two mirrors are adjacent at the same state, and is also switched at the specified frequency, but at a 90 degree phase shift relative to the first population. This means that the second population lags the first by ¼ cycle. In other words, if the signal for population one consists of 16 clock cycles, 8 high followed by 8 low signals, the signal for the second population starts low for 4 cycles, goes high for 8, and goes low for another 4. Since the frequency is evenly divided, this means that the maximum selectable frequency is $\frac{1}{4}^{th}$ the maximum rate at which the DMD 18 can be updated. It also means that the allowable frequencies are limited to those that are representable by a number of clocks that is a multiple of 4. In other words, the frequency where the signal is high 3 clocks and low for 3 clocks will not work, as it cannot represent the 90 degree phase shift. A given mirror element in the array of micro-mirrors of the DMD 18 reflects the light incident upon it in one of two directions, depending on the state that the minor is in. On average, this arrangement of mirror frame data will direct 50% of the incident light towards the "on state" direction and 50% towards the "off state" direction.

The optical systems provided by relay lenses 31a and 31b are oriented at angles with respect to the normal of the DMD 18, positioned to relay the image formed by mirrors oriented in one of their two stable positions along optical paths 32a or 32b, respectively. These relay optics form an image on one of two focal plane detector arrays 20a and 20b. Therefore, one focal plane detector array 20a is capturing light when a mirror element is in the "on state", and the other focal plane detector array 20b is capturing light when the mirror is in the "off state". Focal plane detector array 20a and 20b each is a two dimensional array of photosensitive areas or sites, each of which independently measures the light level incident upon it. This area is commonly called a pixel. A pixel is in part characterized by the wavelength of light that it responds to (the spectral response), the amount of electrical signal it produces in response to a given incident optical power at a specific wavelength (the responsively), the amount of electrical signal it produces when no light is incident on it (the dark signal), and the amount of electrical noise it produces under certain conditions of signal level, temperature, and gain (the noise signal).

A given pixel site on the detector array is arranged with a control signal and an integration capacitor or other charge storage component. At the start of an exposure cycle, the pixel is reset and the charge in the integration component is drained. At the start of a new data collection, the reset is lifted, and the signals generated by the pixel are allowed to accumulate in the integration component. At some later point, the pixel is disconnected or the integration component is sampled. The duration of time that elapsed between the start and stop of allowing the signal to accumulate is called the exposure time. The value that was accumulated in a given exposure time is the pixel's value for that exposure. That charge value is transferred out of the pixel and read by an analog to digital converter, to produce a digital number in proportion to the amount of charge generated by the device. Therefore this number is also in proportion to the amount of light that fell on the pixel during the exposure time. In this manner, the array of photosensitive sites can report a digital representation of the light that was imaged onto that site, which is how a digital camera functions.

Preferably, snap shot arrangement of pixel sites is used, in which every pixel starts and stops integrating signal at the same time. After the signal has been integrated, the array of data values is read out by the microcontroller 22. This may be the same microcontroller that is controlling the mirrors in the DMD 18, or a different microcontroller may be used. This microcontroller 22 will read the detector arrays 20a and 20b from both focal planes at the same time, and ensure that both focal planes start and stop their exposures at the same time. This is commonly referred to as triggering and synchronizing the cameras provided by the two detector arrays 20a and 20b.

The focal plane integration time is at least as long as one cycle of mirror element switching, and typically much longer (camera frame rates on the order of 30 Hz). Faster or slower focal plane integrations can be used. At faster integration time, the camera 10 will detect a wider band of frequencies. In other words, if the mirrors are oscillating at 1000 Hz, a fast integration time may pick up (albeit with less sensitivity) modulated light sources 16 that are not exactly at 1000 Hz, perhaps up to 100 Hz different. As integration times increase, the acceptance band decreases and the two frequencies must become closer for the system to detect the signal, but the sensitivity with which the camera can detect the well matched signal increases. The focal plane integration time should be an integer multiple of the mirror switching period.

The optical systems that comprise the relay optics 31a and 31b between the DMD 18 and a detector array 20a and 20b are arranged such that one mirror illuminates an integer number of pixels in the focal plane, preferably one single pixel, with a minimum of crosstalk or overlap into adjacent pixels. In other words, by turning a mirror off, the corresponding pixel is only gathering signal from dark signal and noise. It does not react to light from adjacent mirrors, because that light is focused into adjacent pixels. It is possible to oversample the DMD 18, meaning that each mirror location corresponds to a square of 4, 9, or 16 pixels in a focal plane detector array, as long as adjacent mirrors likewise correspond to well defined regions of equally sized super pixels that do not overlap with the first such region. The net resolution of the system is the smaller of the DMD resolution and the effective resolution of the detector arrays, which is considered only those regions of pixels corresponding to a single DMD mirror as counting towards total resolution.

Each relay optics 31a and 31b may have optical surfaces (e.g., reflective) for redirecting the light from DMD 18 onto their respective detector 20a and 20b, and also lenses to control magnification and focus onto their respective detector. For alignment of the two-dimensional array mirrors of DMD 18 and the two focal planes onto two-dimensional detectors 20a and 20b, the optical elements of relay optics 31a and 31b should be adjustable in terms of position, magnification, and focus. The arrangement is also preferably aligned so that the two pixels at the same, corresponding locations in both focal planes are illuminated by the same mirror, but this is not a requirement. At the expense of net system resolution, the images resulting from the two focal planes can be translated so that they overlap.

The pixels in the detector arrays 20a and 20b will have a small variation in optical performance. Some may have larger dark signals than others, and the responsivity will differ from pixel to pixel. Measurements performed on the system components are used to quantify these differences, which are encoded as digital data inside the microcontroller 22. After the image data from a given focal plane has been digitized, the data from the earlier calibration measurements is used to adjust each pixels value so that the result approximates the response from a uniform and ideal set of identical pixels. This can take the form of a two point correction, in which, for each pixel, a constant offset value is subtracted from the signal and the result is multiplied by a second value. The microcontroller 22 has available sufficient memory 23 to store the coefficients for each pixel in both detector arrays 20a and 20b, and processing power to move the coefficients into the processing pipeline and apply the transformations to the pixel data as it comes off the focal plane. This results in a pair of detectors 20a and 20b that are calibrated to have as similar a photoresponse as possible. The output from each calibration pipeline is buffered before a subsequent set of processing steps.

Figure 4:
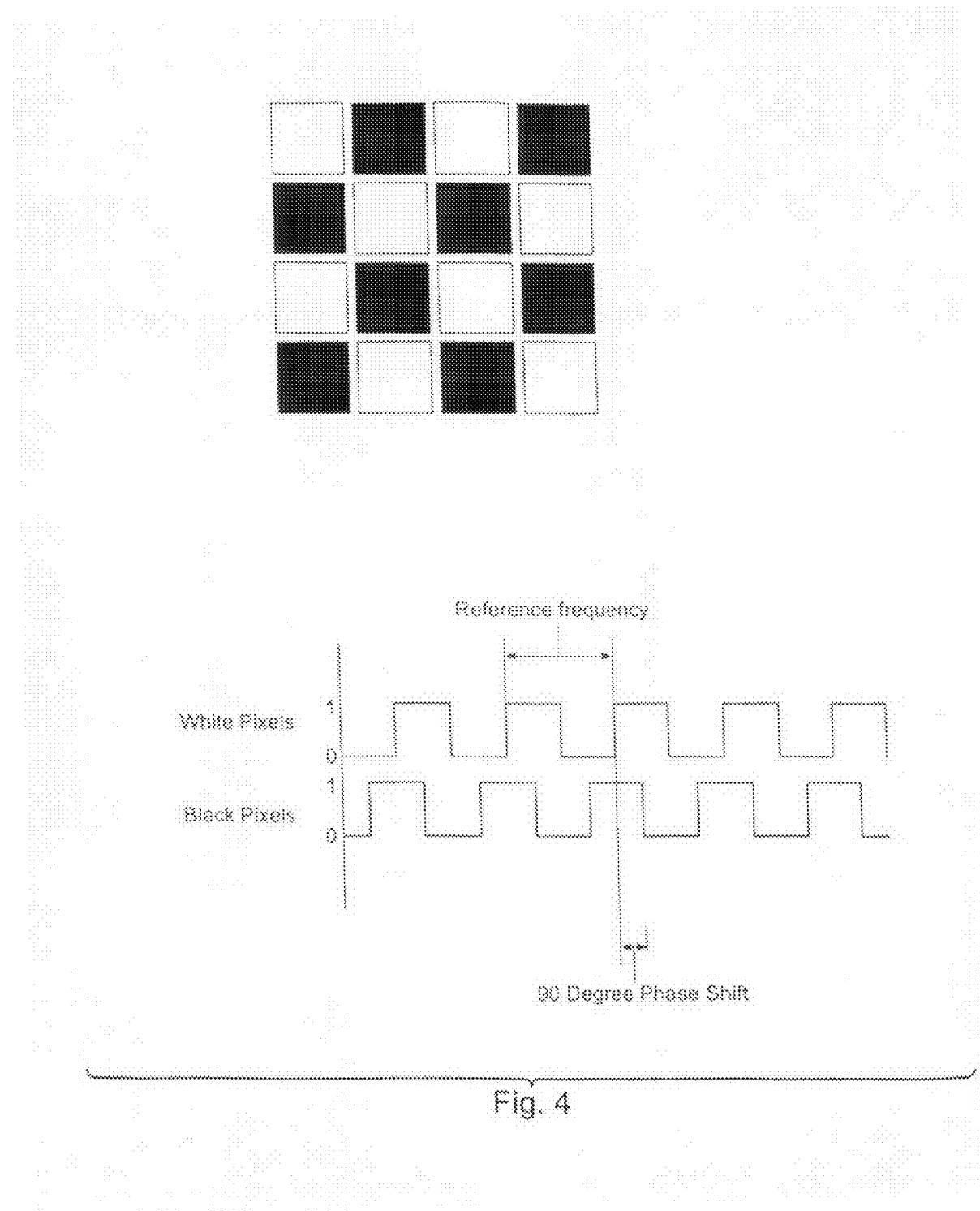
FIG. 4 illustrates the switching pattern which may be used for lock-in detection in the camera of FIGS. 1 and 2.

The DMD 18 is operated so that all mirrors change state simultaneously, also known as a 'full frame update'. The mirror states are generated by controller (or firmware module) 19 under control of microcontroller 22 that supports several operation modes. In a lock-in imaging mode, the mirrors switch in a 4 state pattern. The first population of mirrors in the DMD array, e.g., the first mirror in the DMD array, switches via the repeating cycle: (0 0 1 1), where each number represents a state of on or off, which is to say, pointing at one (0) or the other (1) detector array 20*a* and 20*b* via relay optics 31*a* and 31*b*, respectively. The second population of mirrors in the DMD array, e.g., the two mirrors adjacent to the first mirror (one to the side and one below), operate 90 degrees out of phase: (0 1 1 0). In this example, the mirrors adjacent to those mirrors are identical to the first mirror, in order to obtain two populations of mirrors over the entire assembly, as described earlier. FIG. 4 illustrates this in a subset of a four by four region, in which each box represents a pixel or physical location in the camera, and black and white pixels represents the two different populations. The switching of which light from each pixel population along paths 32*a* (on) and 32*b* (off) is illustrated by the timing diagram. Both populations oscillate at the same frequency between on and off states, the only difference is the 90 phase difference between the two.

The signal driving the states cannot exceed the full frame update rate of the DMD 18, such as tens of kilohertz, but other maximum update rates may be used depending on the DMD. The largest possible effective switching rate of a pixel is therefore the maximum update rate divided by 4, the number of states. The frequency at which the mirrors oscillate can be selected by software in the microcontroller 22 that communicates to the controller 19 which drive the DMD 18 mirrors, by the computer system 12 which communicates with the microcontroller 22. This frequency, once selected, does not change over the course of an image acquisition, but may change between acquisitions. Frequency may also be controlled via command signals from a computer system 12 to microcontroller 22. Since the frequency is an easily adjusted parameter, by simply changing the updates in the DMD 18, the camera 10 can operate at many frequencies or quickly change between them. This can be used to accommodate a frequency hopping source, or to scan an area for previously unknown sources 16.

Consider this state sequence: beginning at the same time, both detector arrays 20*a* and 20*b* begin a new exposure period. Considering as a sample, two adjacent pixels at the first state of this sequence, all of the light in the scene starts out directed into the off state detector. The on state is integrating dark current, and the off state is integrating the imaged scene. In the next state, one mirror element has switched. The first pixel in the on state detector is still integrating dark current, but the second, adjacent pixel has started to integrate scene light, whereas the first pixel in the off state detector is still integrating the scene and the adjacent pixel is only looking at dark signal. In the third state, both pixels in the on state detector are integrating scene light, and the both pixels in the off state detector are integrating dark current. Finally in the fourth state, the first pixel in the on state detector is still integrating scene light, but the adjacent pixel in the on state detector is in the dark. For the off state detector, the first pixel is in the dark and the adjacent pixel is looking at the scene. This then loops back to the first state.

For a typical scene containing natural light, the two different focal planes will not be different. They each will have integrated half of the scene's light in the same timeframe. However, if there is light, such as form one of sources 16, present which switches on and off at the same frequency as the one that the camera 10 is using to drive the DMD 18, the two images collected by detectors 20*a* and 20*b* will start to diverge where that light exists. When the modulated scene light is on, the mirror would be in a position which directed it to one detector and not the other detector. With the modulated light is off, the mirror is directing the normal scene light without the additional signal from the modulated light into the other detector. Over the course of many such oscillations, the first detector ends up integrating more signal than the second detector. The non-modulated light is accumulated equally in both places. Because there may be no way to guarantee that the modulated light source 16 turns on or off at a definite point, there may be cases where the light changes at the exact wrong time and still ends up split equally between the two focal plane regions. If this is the case, the light will be optimally aligned in the time for the adjacent pixel, operating at the 90 degree phase difference. The second population of mirrors in the camera 10 is to catch this other component of the modulated light, so that no matter what the phase relationship is between the two signals (the frequency of the modulated light from sources 16 and the frequency of the DMD mirror oscillation) the camera 10 is able to create a difference between the detectors 20*a* and 20*b* in either one pixel or an adjacent pixel. By having per-pixel control over the beam steering it is possible to form composite data that recovers a phase difference independent value, as well as the phase value itself.

In summary, the path of light of a scene received from a scene by camera 10 in FIG. 5A provides for the light being first split into two paths by the mirror array of DMD 18 under control of microcontroller 22 via DMD controller 19 as described earlier. The two paths 32*a* and 32*b* then travel through matched optical systems 31*a* and 31*b*, respectively, and are imaged onto matched focal plane detector arrays or sensors 20*a* and 20*b*, respectively, which are themselves synchronized such that they start and stop their exposures at the same time. The data from detector array 20*a* is denoted as Image 1 24*a* and from detector array 20*b* as Image 2 24*b*.

Figure 5B:
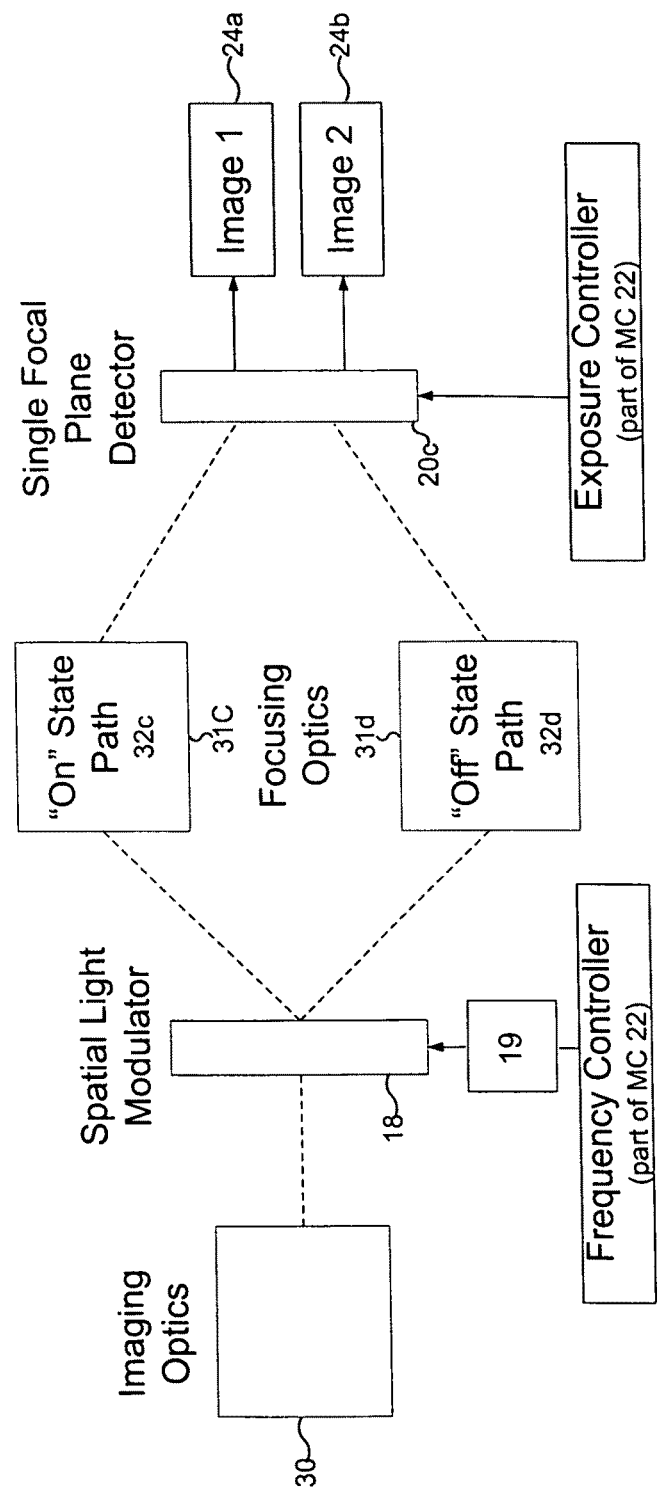

Optionally, instead of using two detectors, a single detector may be used of a two-dimensional pixel size sufficient to capture light from both paths 32*a* and 32*b*, as shown in FIG. 5B. In FIG. 5B, optics 30, DMD 18, controller 19, and the frequency controller provided by microcontroller 22 are the same as in FIG. 5A, except the two detector arrays are substituted with a single focal plane detector array 20*c* and the relay optics differ as a result. Each optical path 32*c* and 32*d* is focused by optics 31*c* and 31*d*, respectively, onto different halves of detector array 20*c* without overlapping. The first half of the detector arrays 32*c* become the Image 1 data 24*a* and the second half of the detector arrays 32*c* becomes Image 2 data 24*b*. In other words, the "on" state of the DMD 18 directs the light rays to half of the pixels of the two dimensional detector array 20*c*, and the "off" state directs light rays to the other half of the pixels of the detector array 20*c*, with minimal overlap of the two areas or regions on the detector array 20*c* occurs. The relay optics 31*c* and 31*d* may be similar to those of relay optics 31*a* and 31*b*, but have surfaces for directing the light onto different regions (or halves) of detector 20*c*. Detector 20*c* is a two-dimensional array of photosensitive sites for receiving and measuring light from optics 31 and 31*b* received thereupon to output image data representing of a two-dimensional array of pixels over the integration period of the detector. In both FIGS. 5A and 5B, an exposure controller is provided which is part of microcontroller 22 which output signals to detectors 20a and 20b, or 20c, to control the start and stop of integration for each exposure, as typical of a digital camera to a detector array. Also, detector arrays 20a-c may be provided which are sensitive to the desired wavelengths of imaging for camera 10.

One feature of camera 10 with DMD 18 is that it provides improved imaging performance than if the beam steering was performed with a single monolithic mirror oscillating at the reference frequency, which would have to be constantly tuned in phase to see the maximized signal. If the distance between the camera 10 and the source 16 was changing at all, such single mirror approach would constantly be falling out of alignment.

With the DMD 18 freely running at some frequency, the focal plane detector arrays 20a and 20b acquire data. The data from each focal plane detector array 20a and 20b is read out into a data buffer as images 24a and 24b. Any image registration shifts are performed by the microcontroller 22 to align the data, so that a given pixel location in each image corresponds to the same pixel on the mirror of the DMD 18. In the case where separate areas of a single detector array 32c are being used, the data buffer is segmented using information stored in the microcontroller 22, and these segments are treated as the independent images 24a and 24b. With the images registered to each other, operations can be performed that combine spatially aligned data points using pixels from both images 24a and 24b. The results of these operations may be stored in secondary buffers in the image pipeline. One such operation is the sum or addition operator. The digital values obtained in a spatial location of detector array 20a (or Image 1 from detector array 20c) are added to the values obtained in the same location in the other detector array 20b (or Image 2 from detector array 20c). Since the light was being split between the detector arrays 20a and 20b (or two areas of detector array 20c), the result of this operation basically mimics the result that would be obtained from a normal single camera without any demodulation. The important operation from the standpoint of the present invention, however, is the difference image. Since the demodulation puts the modulated signal in one of detector arrays 20a and 20b (or of Image 1 or 2 of detector array 20c) more than the other, the difference image results in just the signals related to the modulation and none of the background. This is a signed difference image (as opposed to an absolute difference) as the sign of the result is important in developing the phase value. Both of these results are sent by the microcontroller 22 to computer system 12 where the microcontroller provides the image processing, and/or as video streams 24a and 24b to monitors 14 or 15, through appropriate formatting and communication protocols. Optionally, the image processing may be performed by computer system 12.

The phase independent quadrature amplitude is formed from the signed difference data. The difference image is processed in a fashion similar to RGB processing with a Bayer masked array. In a Bayer mask, spatially adjacent pixels sample different projections of the RGB color space, and are aggregated together to form a single color pixel value. Here, spatially adjacent pixels sample different projections of the demodulated signal into phase space. For each pair of adjacent pixels, a lock-in magnitude signal can be defined at location (i,j) in the final image as the sum of the absolute values of the difference values of the adjacent pixels, (i,j), (i+1,j). Values may be calculated for pairs in a row-wise or column-wise fashion, or for the average of 2×2 windowed regions of pixels, with each individual value participating in 4 separate averages, just as in a Bayer mask. The lock-in phase is calculated from taking the 4-quadrant arctangent of ratios of neighboring difference values. This 4 quadrant calculation is why the initial difference buffer is required to be a signed difference. If it were an absolute difference then only a narrow range of phase could be calculated, and many other phases would map onto the same result. The lock-in magnitude image data and the lock-in phase image data may be presented on suitable outputs of the camera 10 through typical camera system interfaces providing outputs 24a and 24b, and/or interface 26 to computer system 12. Both may be presentable as standard video signals for TV display, such as on monitors 14 and 15, or as digital signals for capture and analysis by computer system 12 as part of a digital imaging system 8.

The DMD 18 may optionally be replaced by a beamsplitter followed by two mirrors oscillating at a phase difference. The resulting four images may be captured on separate quadrants of a large, single focal plane array, or in any subset of synchronized detector arrays. Further, the DMD 18 may optionally be replaced by a four way beamsplitter or prism element coupled to synchronized shutters to achieve the same effect. However, the DMD 18 is preferable since it is more cost effective, as the optical elements are simpler. Moreover, optics with the DMD 18 accommodates a greater number of possibilities by giving control over the exposure of a single pixel.

Figure 5C:
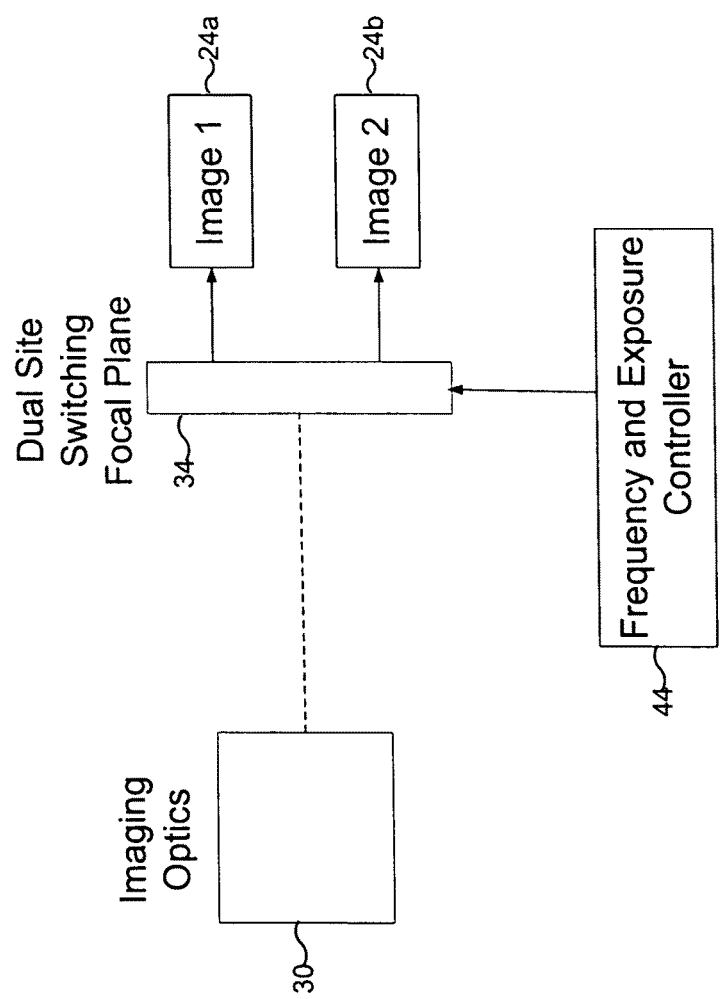
FIG. 5C is a block diagram showing dual site electronic switching for modulated imaging forming two images in the camera of FIGS. 1 and 2 using a switching device at the focal plane of the light from the imaging optics to produce two imaging outputs.
Figure 5D:
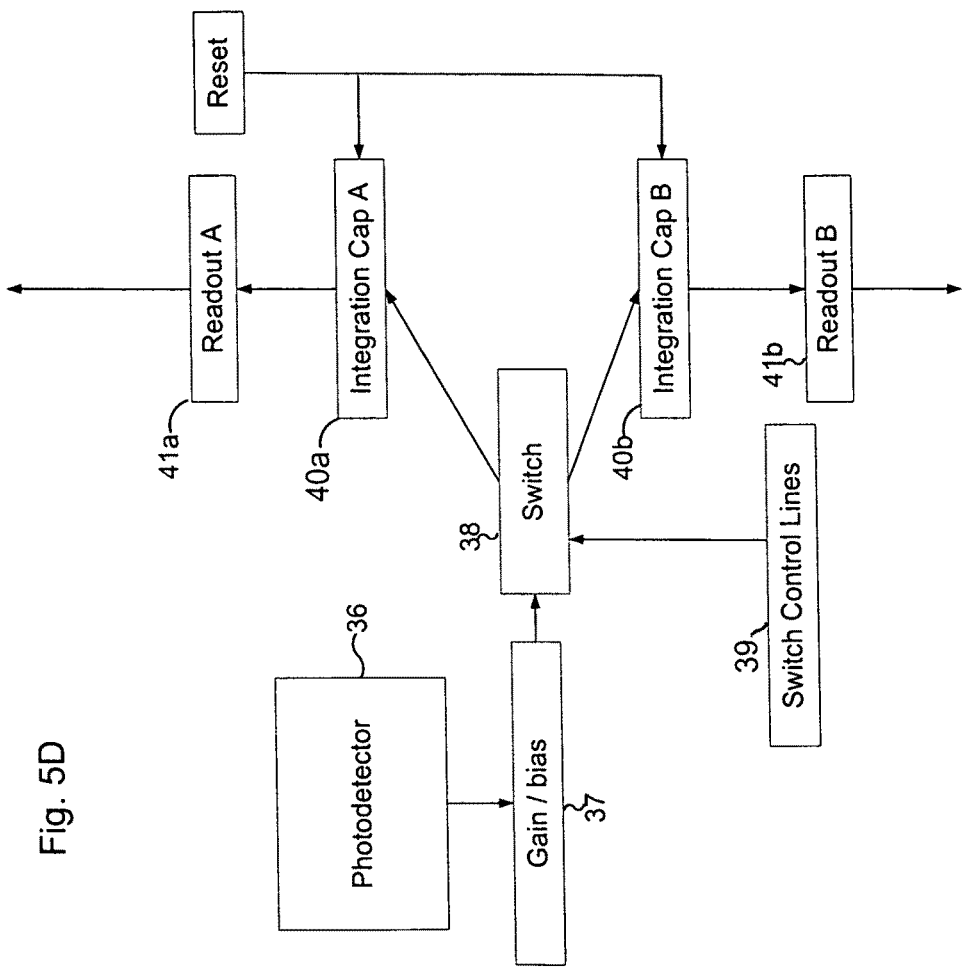
FIG. 5D is a block diagram of the switching device of FIG. 5C for one switching element.

The DMD 18, optics 31a-d, and their respective detector array(s) 20a-c of FIGS. 5A and 5B may also be alternatively provided by a device 34 shown in FIG. 5C providing dual site switching at the focal plane of imaging optics 30. As shown in more detail in FIG. 5D, for each pixel position in a two-dimensional array is a photodetector 36 having a typical structure 37, such as a transimpedance, capacitive transimpedance, current mirror, or source follower, which biases and provides gain to the photodetector to generate a signal current in response to incident intensity of light. Before the signal current is integrated, it passes through a switching element (or switch) 38 with state controlled by an external line 39, or loaded from a locally buffered memory cell. Depending on the state of the switching element 38 the current will go to one of the two independent charge integration sites (or elements) 40a and 40b which are then read out independently. Each integrated site may be a storage capacitor for integrating the signal current when switched thereto. Such controlled switching of the electrical signal representative of the light received onto one of two integration elements are read out to provide pixel values for Image 1 24a and Image 2 24b. Integration sites 40a and 40b each provide a readout 41a and 41b, respectively. The control lines 39 to switch 38, and the reset line 42 enabled at the start of each integration cycle to the integration sites 40a and 40b, is under control of the frequency and exposure controller 44 to providing desired switching as to which of the two populations of pixels is on and off as described earlier. The controller 44 may be part of the microcontroller 22. In this manner, an electronically addressable switch is provided for each pixel to provide dual site switching at the focal plane of light from optics 30. The steering mechanism in FIG. 5C is a digital switch in the pixel to choose which integration site is selected. Switching occurs at the focal plane itself after photodetection, but before change integration by a digital switch which chooses which integration site is selected. The image sensor 20c therefore contains a pair of independent charge integration sites per photosensitive pixel. At this level, the system is much simpler, the single focal plane produces two fields of data corresponding to Image 1 24a and Image 2 24b.

Device 34 thus mirrors the distribution of mirror states of DMD 18 and has two interleaved populations of switches 38, as opposed to individual control for every pixel in the mirror array of DMD 18. Device 38 performs quadrature lock-in measurement. A more complex version of device 34 may be provided with the ability to quickly write states to every pixel in the imager would be a more direct comparison to the DMD 18. The only consequence is that the additional switching and selection circuitry would take up space, which can reduce the sensitivity of the detector.

A camera may have a housing having the optical and electrical components described above, as well as other hardware/software components typical of a digital camera.

Applications for the imaging technique of lock-in imaging could include activities such as search and rescue. An individual in need of rescue could activate a beacon device which was one of these modulated light sources 18 (FIG. 1). By virtue of the sensitivity improvement of the system 8, the light from this source 18 would not have to be very bright, and therefore would be able to operate for a long period of time on a small power source. A search vehicle, equipped with system 8 and knowing the frequency used for rescue beacons, would be able to spot this rescue beacon's location regardless of the ambient conditions. For example, an individual stranded in a bright context, like an ocean, a desert, or snow field, where the sun glare and reflected light may make it difficult to spot them unaided, would be able to create a highly visible signal that is long lived, compared to a bright unmodulated light, like a flare or flashlight. This same scenario has applications in military scenarios as well, where a friendly force wants to be located by other friendly forces, for purposes of tracking, extraction, or verification. In this case, a key requirement is that the beacon signals operate covertly, so that the friendly forces are not simultaneously giving away their positions to the enemy while they are trying to coordinate with other friendly forces. Again, by virtue of the increased sensitivity and selectivity of the imaging system 10, the source 18 providing the beacon can be operated at a signal level that is nearly undetectable without a comparable imaging system 10 for detecting that signal in accordance with the frequency used to modulate the signal.

High dynamic range imaging refers to capturing useful detail in scenes that present a large variation in the amount of light present in the scene. For example, looking into a tree covered area from a brightly lit meadow, or driving down a highway at night where the oncoming lights of other cars are in the field of view. To provide high dynamic range imaging, microcontroller 22 is programmed to select on a pixel by pixel basis switching by DMD 18 (FIGS. 5A and 5B) or device 33 (FIG. 5C) onto sites providing data of Image 1 24*a* or data of Image 2 24*b* based upon the value of that pixel from previously captured image data by camera 10. First, camera 10 is operated to obtain a base image (e.g., Image 1 or 2, or combination thereof) to determine which pixels will need to be shunted between forming Image 1 and Image 2 in the next exposure, in accordance with their intensity value (or brightness) in the base image. For example, in obtaining the base image, site switching may be as described earlier using the two population setting or mode. In the subsequent camera exposure, switching for each pixel from sites for Image 1 to sites of Image 2 occurs once during the integration, at a time that is a function of the signal level (or intensity value—brightness) that was present for that pixel in the data of the base image. For example, this function may be a preset threshold value or a threshold value based on a percentage of the pixels of high values in that base image. This allows bright signals to be captured in the same exposure as a dark signal. In other words, the bright signals (or light) would integrate for a short time period on sites providing Image 1, and all subsequent light would be directed onto sites of Image 2, acting like an overflow valve. The darker (or dimmer) areas of a scene thus continue to integrate in Image 2. The microcontroller 22 produces a composite image of the values of pixels from Image 1 and Image 2 data having extended bit depth (e.g., composite image has the values from Image 1 for pixels where bright pixels were previously, and values from Image 2 for all other pixels). The composite image may be outputted such to one of the monitors 14 or 15, to computer system 12, or both. Thus, using system 8 to produce a high dynamic range image, the bright sources in such image are capped before they can spill over into nearby pixels and obscure their detail, while the dark areas are allowed the maximum amount of integration time so that the details can be observed. The digital processing herein may all or in part also be performed by computer system 12, which may control camera 10 (via signals to microcontroller 22) to operate as desired.

Dual band imaging utilizes some specific spectral difference in a scene of interest and emphasizes that spectral difference by creating enhanced contrast in the final image. For example, knowing that a particular chemical, when present in the air, absorbs the light in a narrow spectral band, then that effect may be measured by constraining one optical path onto the optical detector of FIGS. 5A-B for measuring Image 1 to measure the amount of light in that band (such as by use of a band filter), and the other optical path to measure a baseline value onto the other optical detector for measuring Image 2. Comparing the two resulting images on monitors 14 and 15 by a user, or by computer system 12 can give an indication of the presence of that chemical. Such measurements can be useful for detecting contaminants, leaks, or spills.

From the foregoing description, it will be apparent that a camera, system, and method for dual site imaging have been provided. Variations and modifications of the herein described camera, system, and methods for implementing the camera will undoubtedly suggest themselves, to those skilled in the art. Accordingly the foregoing description should be taken as illustrative and not in a limiting sense.

The invention claimed is:

1. An imaging system comprising:
   an array of elements switchable between two states spatially related to a two-dimensional array of pixel positions;
   a first site for each of the pixel positions to measure light received by said system to provide values of pixels comprising first image data;
   a second site for each of the pixel positions to measure light received by said system to provide values of pixels comprising second image data, in which said first site and said second sites for each of the pixel positions operate independently for measuring light received over a common integration time; and
   wherein for each of said pixel positions when one or more of said switchable elements which are spatially related with the pixel position are switched to a first of said states said first site for the pixel position measures light received by said system, and when one or more of said switchable elements which are spatially related with the pixel position are switched to a second of said states said second site for the pixel position measures light received by said system, wherein said switchable elements are operable to switch between said states faster than the integration time.

2. The system according to claim 1 wherein said first image data represents a two-dimensional array of pixels having the values from the first site of each of said pixel positions, said second image data represents a two-dimensional array of pixels having values from the second site of each of said pixel positions, and said first image data and said second image data spatially correlate with each other.

3. The system according to claim 2 wherein said first image data and said second image data each represent one of successive frames of different video streams.

4. The system according to claim 1 wherein said first site for each of said pixel positions represents a light receiving and measuring element of a first detector, and second site for each of said pixel positions represents a light receiving and measuring element of a second detector.

5. The system according to claim 4 wherein each of said switchable elements is a micro-mirror positionable between two states in which when switched to said first of said states said light is steered along a first path, and when switched to said second of said states said light is steered along a second path, and said system further comprises first optics for directing light along said first path to said first detector, and second optics for directing light along said second path to said second detector.

6. The system according to claim 5 further comprising one or more optical filters along at least one of said first and second optical paths to enable light along at least one of said first and second paths to be different wavelength or range or wavelengths from the other of said first and second paths.

7. The system according to claim 5 further comprising one or more optical filters along at least one of said first and second optical paths to enable light along one of said first and second paths to be of a different polarization from the other of said first and second paths.

8. The system according to claim 1 wherein said first site for each of said pixel positions represents a light receiving and measuring element of a first region of a detector, and second site for each of said pixel positions represents a light receiving and measuring element of a second region of said detector, in which said first region and said second region are non-overlapping with each other.

9. The system according to claim 8 wherein each of said switchable elements is a micro-mirror positionable between two states in which when switched to said first of said states said light is steered along a first path, and when switched to said second of said states said light is steered along a second path, and said system further comprises first optics for directing light along said first path to said first region of said detector, and second optics for directing light along said second path to said second region of said detector.

10. The system according to claim 9 further comprising one or more optical filters along at least one of said first and second optical paths to enable light along at least one of said first and second paths to be different wavelength or range or wavelengths from the other of said first and second paths.

11. The system according to claim 9 further comprising one or more optical filters along at least one of said first and second optical paths to enable light along one of said first and second paths to be of a different polarization from the other of said first and second paths.

12. The system according to claim 1 wherein each of said switchable elements is spatially related to a different one of said pixel positions.

13. The system according to claim 12 wherein for each of said pixel positions said first site and said second site for the pixel position are both associated with a common light receiving element for converting light into an electrical signal, and when one or more of said switchable elements which are spatially related with the pixel position are switched to said first of said states said first site for the pixel position measures said electronic signal, and when one or more of said switchable elements which are spatially related with the pixel position are switched to said second of said states said second site for the pixel position measures said electronic signal.

14. The system according to claim 1 wherein said first site and said second sites for each of said pixel positions operate synchronously.

15. The system according to claim 1 further comprising means for controlling the state of each of said switchable elements.

16. The system according to claim 15 wherein said controlling means controls the state of said switchable element at a selected frequency.

17. The system according to claim 1 wherein in said array of switchable elements adjacent one of said elements are switched 90 degrees out of phase with respect to each other.

18. The system according to claim 1 wherein in said array of switchable elements adjacent one of said elements are switched 90 degrees out of phase with respect to each other to provide a first plurality of switchable elements switching at the same one of said states at the same time, and a second plurality of switchable elements switching at the same one of said states 90 degrees out of phase with respect to said first plurality of switchable elements.

19. The system according to claim 1 wherein said array of switchable elements is part of a bi-stable spatial light modulator.

20. The system according to claim 1 wherein said states of said switchable elements are simultaneously updated at least four times faster than said integration time.

21. The system according to claim 1 wherein said first image data and said second image data over said integration time represent one exposure of said imaging system, and said first image data and said second image data is used to control operation of said switching elements for subsequent one of said exposure.

22. The system according to claim 1 wherein said first image data and said second image data over said integration time represent one exposure of said imaging system, and said first image data and said second image data is used to change one of timing or selection of the states of switching elements for subsequent one of said exposure.

23. The system according to claim 1 wherein said second image data represents overflow data, and combined with said first image data in accordance with the duration the switchable elements were in said first state during said exposure to determine high dynamic range pixel values for each of said pixel positions.

24. The system according to claim 1 further comprising means for determining the difference between said first image data and said second image data formed by patterns of switching said switching elements to derive a quadrature amplitude image and a quadrature phase image.

25. The system according to claim 24 wherein the phase image provides range information.

26. The system according to claim 24 further comprising means for adding said first image data and said second image data to provide third image data, and said a quadrature amplitude image and said quadrature phase image is used to one of enhance, modify, annotate, or transform the third image data.

27. The system according to claim 1 further comprising means for adding said first image data and said second image data to provide third image data, and said third image data provides a representation of a background image.

28. The system according to claim 1 further comprising means for adding said first image data and said second image data to provide third image data, and said third image data is used to extend the dynamic range of the imaging system.

* * * * *